3,285,866
PROCESS FOR MAKING POLYURETHANE FOAMS USING TRIMETHYLAMINE AS A CATALYST AND BLOWING AGENT
George T. Gmitter, Akron, Ohio, assignor to The General Tire & Rubber Company, Akron, Ohio, a corporation of Ohio
No Drawing. Filed Feb. 7, 1964, Ser. No. 343,221
6 Claims. (Cl. 260—2.5)

This invention relates to polyurethane foams and to the manufacture thereof using trimethylamine as a blowing agent in anhydrous foaming systems.

Urethane foams have heretofore been prepared from four basic ingredients: a polyether or polyester resin containing two or more hydroxyl groups per molecule, an organic diisocyanate or polyisocyanate, water and a catalyst, commonly a tertiary aliphatic amine. Organo-metal, lead or tin etc. compounds are also often used as catalysts. Surfactants to control cell size in the foam are also desirable. Foaming is achieved by the reaction of water, for example, with isocyanate in excess of that needed to react with the resin, whereby carbon dioxide is generated and causes the system to foam. In one of the techniques used for preparing foams the resin and isocyanate are reacted to form a liquid prepolymer from which a foam is made by the addition of water and catalyst. In the so-called "one-shot" technique all the foam formulation ingredients are mixed at one time causing simultaneous polymerization and foaming.

As a result of the large amount of expensive polyisocyanate necessary for the isocyanate-water reaction to produce sufficient carbon dioxide, the cost of production of the foam has been high. Many attempts have been made using lower cost external blowing agents to produce a urethane foam with little or no water and a low isocyanate level, thus reducing the foam cost while maintaining or improving the foam properties. However, the products have been softer, higher density foams with poor compression sets. At the low isocyanate levels the heat produced in the normally exothermic reaction system is decreased, and it is difficult making the reaction go to completion. Furthermore, external blowing agents tend to reduce the maximum exotherm temperature because of absorbing heat by their vaporization.

It is, therefore, a primary object of this invention to provide a process for the production of urethane foams using a minimum amount of polyisocyanates.

It is another object of this invention to produce a foam of low isocyanate level.

It is another object of this invention to produce an improved urethane foam of low density at a substantially lower cost than present production foams.

Another object of this invention is to provide rigid or semi-rigid urethane foams which are dry to the touch and not friable shortly after the completion of the foam reactions.

These and other objects and advantages of the present invention will become more apparent to those skilled in the art from the following detailed description.

According to the present invention, trimethylamine is used to replace substantially all of the water in the previously employed polyurethane foam systems and acts as both a catalyst and a blowing agent. It has been found that trimethylamine greatly increases the desirable qualities of the foam while at the same time allowing the isocyanate level to be reduced.

The urethane compounds are produced by reacting a polyisocyanate having two to three isocyanato groups with a polyol or polyhydric compound preferably of high molecular weight having preferably two to three terminal hydroxyl groups. A liquid mixture of polyols of varying molecular weight may be used. Generally, the polyol is a liquid of more than 500 average M.W. If the polyol is a solid it should be heated or dissolved to be in the liquid state. Preferred molecular weights are between 1000 and 5000, especially for flexible foams although for rigid foams molecular weights as low as 300 or 400 may be used. The term "polyhydric" includes both carboxyl OH groups as well as alcoholic OH groups. Commercial polyurethanes have been prepared employing as the hydroxy compound polyhydric polyethers, polyhydric polyesters, various polyoxyalkylene polyols including glycols and triols and various other polyhydric alcohols. The polyethers are usually polyalkylene ether glycols, or triols, and the polyhydric polyesters are usually obtained by the reaction of a dicarboxylic acid with one or more polyhydric alcohols such as a diol, triol, tetrol or other polyglycol to produce a hydroxy terminated polyester.

The linear polyether and polyester polyols may be extended further by reaction with an alkylene or arylene diisocyanate producing urethane linkages which contain available hydrogen attached to the nitrogen atom for reaction with more isocyanate. It is usually preferable to employ an organic hydroxy compound in the form of a linear hydroxyl-terminated polyester or polyether having a molecular weight of 1500 to 5000 for the preparation of flexible foams. The active hydroxyl hydrogens available at the ends of the polyether or polyester chain are capable of reacting with diisocyanates to form chain-extended compounds having repeated urethane linkages.

Typical examples of suitable isocyanates include 2,4-tolylene diisocyanate, 2,6-tolylene diisocyanate, p-phenylene diisocyanate, m-phenylene diisocyanate, diphenyl methane diisocyanate, butylene-1,4-diisocyanate, 2-methylbutane-1,4-diisocyanate, cyclohexylene dissocyanate, 2,4-naphthylene diisocyanate, benzene triisocyanate, and polymethylene polyphenyl isocyanate (Papi), polymeric polyisocyanates, as well as mixtures of polyisocyanates.

Suitable polyhydric compounds which can be reacted with the isocyanates include branched chain polyols or hydroxyl terminated condensation products of propylene oxide or of mixed ethylene and propylene oxides or other alkylene oxides with polyhydric alcohols of 3 to 8 hydroxyl groups such as with glycerol, 1,3,6-hexanetriol, and sorbitol, linear polyols such as polypropylene ether glycol, polyisopropylene ether glycol, ethylene glycol, hexamethylenediol, cyclohexanediol, 1,4-butanediol and liquid hydroxy terminated polyesters formed by reaction of a dicarboxylic acid such as adipic, sebacic acid, etc. with one or more of the above glycols alone or with a small amount of a higher polyol, i.e., hexanetriol, pentaerythritol, etc.

The foams may be made by the prepolymer method or the "one-shot" method.

In accordance with the present invention, it has been discovered that the reactions of polyisocyanates with polyhydric compounds in the absence or substantial absence of water with trimethylamine can be practical and substantially quantitative one. The trimethylamine serves two functions. First, it catalyzes the exothermic reaction between the polyisocyanates and polyhydric compounds. Second, due to its volatile nature it acts as a blowing agent in the hot reaction system. In this manner polyurethane foams having selected physical properties can be produced using a substantially smaller amount of polyisocyanate than was required with the isocyanate-water foaming system.

In the manufacture of polyurethanes according to the method of this invention, it is customary to react one equivalent weight of the polyester or polyether polyol having 2 to 8 terminal hydroxyl groups and a molecular weight of 300 to 10,000 with from about 0.8 equivalent to 6 equivalent weights of an organic (aliphatic or aromatic) diisocyanate or polyisocyanate for both the prepolymer and "one-shot" foam systems. For rigid polyurethane foams lower molecular weight polyols with higher hydroxyl functionality are also desirable as aforesaid.

Such equivalent ratio is preferably in the neighborhood of 1:1 with a slight excess of isocyanate, e.g., 1.1:1 to 1.5:1 polyisocyanate to polyol. The amounts of the ingredients used are well known in the art and can be varied considerably. Any of the additives common to polyurethane foams can be incorporated into the anhydrous systems of this invention. The most common of these are silicone oils including the oily polydimethylsiloxanes and the block polymer hereinafter described in Example I which act as foam stabilizers and improve uniformity of pores of the foam. Catalysts, fillers, dyes, antioxidants, plasticizers, crosslinkers, and the like can also be incorporated herein.

Surfactants, compatible with the polyurethane during formation or polyurethane reactants are generally required for good uniform cell structure and size although in some instances in the manufacture of rigid foams using the prepolymer process and polyether polyols good uniform cell structure can be obtained without using surfactants provided care is used in the selection and control of the reactants. For example, in the general preparation of polyurethane foams using polyether polyols, flexible or rigid, by the "one-shot" process, silicone block polymers or polysiloxane-polyoxyalkylene block copolymers are required. These silicone block copolymers are shown in U.S. Patent 2,834,748, Bailey et al., dated May 13, 1958 entitled "Siloxane-Oxyalkylene Block Copolymers." An example of a very useful silicone block copolymer as shown by this patent has the general formula:

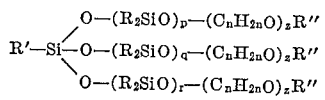

For the general preparation of flexible or rigid polyurethane foams by the prepolymer process using the polyether polyols, it is desirable to use the poly dimethyl siloxane and similar substituted silicone liquids (DC-200) as shown by U.S. Patent No. 2,901,445 to Harris dated August 25, 1959 and are generally used in a viscosity range of 5–1000, preferably 40–500, centistokes at 25° C. When making flexible foams using polyester polyols by the "one-shot" and prepolymer processes the surfactant should be a nonionic surfactant or a mixture of a nonionic surfactant and a smaller amount of an anionic surfactant. For making rigid foams using polyester polyols by the "one-shot" and prepolymer processes only a small amount of a nonionic surfactant is used with little or no anionic surfactant. Examples of nonionic and anionic surfactants are nonyl phenoxy polyoxyethylene ethanol (of other polyalkoxylated phenols or alkyl phenols), polyoxyethylated vegetable oils, sodium dioctyl, sulfosuccinate, polyethylene glycol tertiary dioctyl thioether, sodium-N-cyclohexyl-N-palmitoyl taurate, soaps of oleic acid and diethyl amine, polyethylene glycol tertiary dodecyl-thioether and so forth. Still other anionic and nonionic surfactants can be found in the book, "Detergents and Emulsifiers," John W. McCutcheon, Inc., Morristown, New Jersey, 1962, approximately 158 pages.

The surfactants are generally used in only a minor amount by weight sufficient to obtain good uniform cells and size of cells. Generally the surfactant can be used in an amount of from about 0.05 to 2.0 parts by weight based on 100 parts total weight of the polyol employed to make the polyurethane.

In the one shot process all of the ingredients necessary to make the foam are mixed together at one time and the mixture allowed to foam or discharged to a zone or receptable where foaming takes place. Such ingredients may be separately charged to the mixing apparatus or certain of the ingredients may be premixed together to reduce handling prior to their delivery to the head of the foaming machine. Likewise, in some instances the polyisocyanate may first be reacted with polyol to form an NCO terminated polyol, a polyisocyanate, containing possibly some free isocyanate which is then mixed with more polyol and the other foaming ingredients. In the prepolymer process generally the polyisocyanate and polyol are reacted together to form a polyurethane prepolymer to which is then added more polyisocyanate (if needed), the catalyst (and blowing agent), and surfactant.

The amount of trimethylamine which can be employed in the anhydrous polyurethane foaming systems of this invention varies widely depending on the desired physical properties for the foam, on the components to be reacted to form the cured polyurethane and on the presence or absence of other external blowing agents. When the amount of the blowing agent is less than about 2 percent by weight the expansion is insufficient to obtain the advantages and when the amount of the blowing agent is more than about 15 percent by weight trimethylamine based on the combined weights of the reactants in the system, the expansion becomes too great and the foams too weak for most applications. The preferred range is from 3 to 10 percent by weight trimethylamine based on the combined weights of the reactants (polyisocyanate and polyol, or polyurethane prepolymer).

The trimethylamine can be augmented as a blowing agent by other external blowing agents such as the halogenated alkane derivatives commonly used as propellants, including for example, fluorotrichloromethane, difluorodichloromethane, fluorodichloromethane and dichlorotetrafluoroethane. These additional blowing agents can be used in amounts up to about 30 percent by weight, preferably no more than about 20 percent by weight, based on the combined weights of the reactants.

Since trimethylamine is a catalyst in the polyurethane crosslinking system, the activity of the system increases with an increasing amount of the amine. At the same time, the other external blowing agents tend to retard this curing system. Thus, the amounts of trimethylamine and other external blowing agents can be balanced to control the rates of cure and foaming and the physical properties of the resulting foams.

The present invention is particularly useful in making rigid polyurethane foams and in making compositions which can be spray coated on a surface to form a polyurethane foam.

The invention is further illustrated by the following examples. Quantitative measurements are in parts by weight unless otherwise stated.

*Example I*

A prepolymer was made by mixing a mixture of (a) 17.9 parts of 1,2,6-hexanetriol and (b) 100 parts of a commercially available propylene oxide adduct of 1,2,6-hexanetriol, said adduct having a hydroxyl number of 240 and a molecular weight of about 700 with (c) 258 parts of 4:1 mixture of 2,4-tolylene diisocyanate and 2,6-tolylene diisocyanate and allowing the ensuing reaction to complete itself at slightly elevated temperatures in a closed container. The isocyanate content of the prepolymer thus made was 23.8–24 percent reactive isocyanate.

The following ingredients were then mixed together at room temperature and poured into an open mold:

| | Parts |
|---|---|
| The prepolymer described above | 90.0 |
| Propylene oxide adduct of sorbitol having a hydroxyl No. of 650 | 42.0 |
| A polyalkylene oxide-polydimethyl siloxane block copolymer* | 2.0 |
| Trimethylamine | 10.0 |

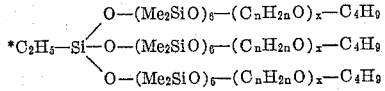

where each $(C_nH_{2n}O)_x$ is a mixed polyoxyethylene-oxypropylene block containing about 17 oxyethylene and 13 oxypropylene units.

The resulting foam product had a density of 1.97 pounds per cubic foot.

*Example II*

Example I was repeated with all of the conditions remaining the same except that 23 parts of trichlorofluoromethane was used as a blowing agent instead of trimethylamine. Two-tenths part of lead octoate was used as a catalyst. The foam had a density of 1.91 pounds per cubic foot. This shows that only about 10 parts of trimethylamine based on the reactants was required to produce a foam which by an alternate system required approximately 23 parts of trichlorofluoromethane as the sole blowing agent.

*Example III*

A prepolymer was obtained by mixing 333 parts of a propylene oxide extended commercial styrene-allyl alcohol copolymer with 540 parts of the 4:1 tolylene diisocyanate mixture employed in Example I. The propylene oxide extended styrene-allyl alcohol copolymer had the general formula:

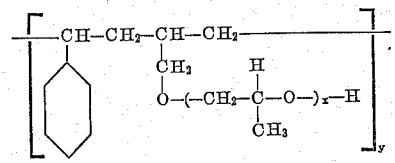

in which $x$ had an average value of 2, $y$ had an average value of 5, and the copolymer had a hydroxyl No. of 162. The mixture was maintained in a closed container at room temperature (about 25° C.) or slightly above for several hours to allow the reaction to go to completion. The isocyanate content of the prepolymer equaled 25.2% reactive isocyanate.

The following ingredients were mixed together at room temperature, and the mixture was sprayed at a spraying pressure of 40 p.s.i. on a vertical surface:

| | Parts |
|---|---|
| The prepolymer described above | 135.2 |
| Propylene oxide adduct of sorbitol having an hydroxyl value of 490 | 79.8 |
| The alkylene oxide-dimethyl siloxane block copolymer employed in Example I | 3.0 |
| Trichlorofluoromethane | 9.75 |
| Trimethylamine | 8.5 |

The resulting foam had a density of 2.36 pounds per cubic foot. By the use of trimethylamine in combination with trichlorofluoromethane the total blowing agent amounted to about 8.5 percent based on the reactants compared with the approximately 17.4 percent blowing agent which was necessary when trichlorofluoromethane was used alone as stated in Example I.

Having described my invention, I claim:

1. A method of preparing a polyurethane foam comprising:
    (I) reacting
        (a) an organic polyisocyanate with
        (b) a polyhydric organic compound,
    (II) in the presence of a catalyst and blowing agent consisting of:
        (i) trimethylamine, or
        (ii) mixtures of trimethylamine and a halogenated alkane wherein trimethylamine is present in an amount equal to at least 70% of the mixture wherein, (i) and (ii) are present in an amount equal to from 2 to 15% by weight of (a) and (b); and wherein, said organic polyisocyanate is present in amounts such that there is one equivalent weight of said polyhydric organic compound for from about 0.8 to 6 equivalent weights of said organic polyisocyanate.

2. The method defined in claim 1 wherein (a) is a prepolymer selected from the group consisting of polyethers and polyesters, said prepolymer having its ends terminated by isocyanato groups.

3. The method according to claim 1 in which the reaction is conducted additionally in the presence of a minor amount by weight of a surfactant sufficient to control cell size.

4. A method of preparing a polyurethane foam which comprises reacting:
    (a) an organic diisocyanate with
    (b) a polyhydric organic compound selected from the group consisting of polyhydric alcohols, polyhydric ethers and polyhydric polyesters in the presence of a catalyst and blowing agent consisting of trimethylamine or mixtures of trimethylamine and a halogenated alkane wherein trimethylamine is present in an amount equal to at least 70% of the mixture, said blowing agent being present in an amount equal to from 3 to 10% by weight based on the combined weights of (a) and (b), said diisocyanate being present in amounts such that there is one equivalent weight of said polyhydric organic compound for from about 0.8 to 6 equivalent weights of said diisocyanate.

5. The method defined in claim 4 wherein the diisocyanate (a) is an arylene diisocynate and the polyhydric organic compound (b) is a polyester having a molecular weight of about 1500 to 5000 and formed by reacting a polyhydric alcohol with a polycarboxylic acid.

6. The method according to claim 4 in which the reaction is conducted additionally in the presence of a minor amount by weight of a surfactant sufficient to control cell size.

References Cited by the Examiner

UNITED STATES PATENTS

| 3,037,946 | 6/1962 | Guest et al. | 260—2.5 |
| 3,067,150 | 12/1962 | Dombrow et al. | 260—2.5 |
| 3,073,788 | 1/1963 | Hostettler et al. | 260—2.5 |
| 3,159,591 | 12/1964 | Lanham | 260—2.5 |
| 3,168,497 | 2/1965 | Twitchett | 260—77.5 |

LEON J. BERCOVITZ, *Primary Examiner.*

F. McKELVEY, *Assistant Examiner.*